Patented Dec. 28, 1948

2,457,769

UNITED STATES PATENT OFFICE 2,457,769

RESINOUS ESTERS OF POLYHYDRIC ALCOHOLS WITH POLYMERS OF STYRENE AND RESIN ACIDS AND METHOD FOR PREPARATION THEREOF

James A. Arvin, Homewood, and Wayne B. Gitchel, Chicago, Ill., assignors to The Sherwin-Williams Company, Cleveland, Ohio, a corporation of Ohio No Drawing. Application August 30, 1945, Serial No. 613,702

14 Claims. (Cl. 260—23)

This invention relates to new and improved aliphatic esters of polymers of styryl compounds and resin acids of the type containing a free carboxylic acid group or groups, more particularly esters of polyhydric alcohols with rosin-styrene polymers, and to compositions containing these esters.

One of the objects of the invention is to produce new and improved resinous compositions from resin acids of the type containing a free carboxylic acid group.

A further object is to provide new and improved resinous compositions which are compatible with drying oils.

Another object of the invention is to produce new and improved film forming compositions from readily available raw materials.

A still further object of the invention is to provide new and useful film forming materials which produce excellent clear, hard films of high gloss, toughness, hardness, adherence, good brushing characteristics, satisfactory drying characteristics and good recoatability.

An additional object of the invention is to provide new and improved types of enamels. Other objects will appear hereinafter.

In accomplishing these objects, a resin acid of the type containing a free carboxylic acid group (e. g. rosin) is polymerized with a styryl compound (e. g. styrene), and the resultant polymer is esterified with an aliphatic alcohol, preferably a polyhydric alcohol (e. g. glycerine). The resultant ester, when bodied directly with a drying oil, produces a composition having excellent film-forming characteristics and which is suitable for use in varnishes and enamels when thinned with solvents.

The polymerization of the resin acid and the styryl compound is effected by heating, preferably at temperatures below the decomposition temperatures of the reacting components and above about 300 degrees F. Good results have been obtained without the use of catalysts but catalysts may be used if desired.

In the practice of the invention, using rosin and styrene, it is preferable to heat the reacting ingredients to refluxing temperatures and to increase the temperature to maintain refluxing conditions during the polymerization. Styrene refluxes at about 325 degrees F. in the presence of rosin under atmospheric pressure conditions Rosin begins to decompose at temperatures above 550 degrees F. and hence it is desirable to maintain temperatures below this point while free rosin is present.

The reaction of the polymer with the alcohol is conducted at elevated temperatures, preferably around 400 to 750 degrees F. depending upon the type of alcohol and the pressure conditions. Atmospheric pressures are ordinarily employed and no blowing is necessary. This reaction may be effected, however, under atmospheric, sub-atmospheric or super-atmospheric pressures with or without blowing. The heating is continued until the desired reaction has been effected and the desired body has been obtained which will usually require one hour at 400–500 degrees F. and around 3 to 6 hours at temperatures of 550–600 degrees F. Since polymerization and esterification reactions are occurring simultaneously, the use of higher temperatures may affect somewhat the properties of the products, the higher temperatures tending to speed polymerization more than esterification.

The invention will be illustrated, but is not limited by the following examples in which the quantities are stated in parts by weight, unless otherwise indicated:

Example I

A mixture of nine parts of rosin and one part of styrene was heated with stirring at 320–440 degrees F. over a period of 4 hours and 45 minutes, the temperature being raised as rapidly as permitted by the reflux. The product was a clear, amber, brittle resin having a bar melting point of 143 degrees F. and an acid number of 144. This polymer was used in making the compositions of Examples II–IV.

Example II

Four hundred parts of the polymer prepared in Example I, 35 parts of glycerine, and 0.8 part of calcium oxide were heated at 460 degrees F. for 1 hour and at 550 degrees F. for 4 hours and 15 minutes. The resultant ester had a bar melting point of 174 degrees F. and an acid number of 12.

A mixture of 538 parts of the foregoing ester and 852 parts of dehydrated castor oil was heated at 550 degrees F. for 4 hours and 30 minutes.

The product had an acid number of 6, a "cure" of 27 seconds, a viscosity of S (Gardner-Holdt) at 60% solids in mineral spirits, and gave clear films with excellent drying and toughness characteristics.

Example III

Two hundred and fifty parts of the polymer prepared in Example I, 23.7 parts of pentaerythritol and 0.5 part of calcium oxide were heated at 460 degrees F. for one hour and at 550 degrees F. for 12 hours and 30 minutes. The resultant ester had a bar melting point of 187 degrees F. and an acid number of 9.5.

A mixture of 200 parts of the ester and 317 parts of dehydrated castor oil was heated at 550 degrees F. for 3 hours and 15 minutes. The product had an acid number of 5.4, a "cure" of 27 seconds, and a viscosity of U-V (Gardner-Holdt) at 60% solids in mineral spirits, and gave clear films with excellent drying and toughness characteristics.

Example IV

Two hundred and fifty parts of the polymer prepared in Example I, 29.5 parts of sorbitol and 0.5 part of calcium oxide were heated at 460 degrees F. for 1 hour and at 550 degrees F. for 12 hours and 50 minutes. The resultant ester had a bar melting point of 182 degrees F. and an acid number of 29.7.

A mixture of 200 parts of the ester and 317 parts of dehydrated castor oil was heated at 550 degrees F. for 3 hours and 30 minutes. The resultant varnish had an acid number of 15.9, a "cure" of 27 seconds, a viscosity of O (Gardner-Holdt) at 60% solids in mineral spirits, and gave clear films with excellent drying and toughness characteristics.

Example V

A mixture of three parts of rosin and one part of styrene was heated with stirring at 440 degrees F. for 4 hours, steam blown at 440 degrees F. for 45 minutes and carbon dioxide blown for 15 minutes. The resultant polymer was a clear, brittle, amber solid with a bar melting point of 160 and an acid number of 123. This resin was used in making the compositions of Examples VI-XIII.

Example VI

Four hundred parts of the polymer prepared in Example V, 35 parts of glycerine and 0.8 part of calcium oxide were heated with stirring at 550 degrees F. for 6 hours and 30 minutes.

A mixture of 343 parts of the resultant ester (acid number of 9.6) and 542 parts of dehydrated castor oil was heated at 550 degrees F. for 6 hours and 30 minutes. The product had an acid number of 16, a "cure" of 27 seconds, a viscosity of T (Gardner-Holdt) at 60% solids in mineral spirits, and gave clear films of excellent drying and toughness characteristics.

Example VII

Four hundred parts of the polymer prepared in Example V, 32.2 parts of pentaerythritol and 0.8 part of calcium oxide were heated with stirring at 550 degrees F. for 17 hours and 30 minutes.

A mixture of 342 parts of the resultant ester (acid number of 9.5) and 541 parts of dehydrated castor oil was heated at 550 degrees F. for 4 hours and 15 minutes. The product had an acid number of 14.4, a "cure" of 29 seconds, a viscosity of Q (Gardner-Holdt) at 60% solids in mineral spirits, and gave clear films of excellent drying and toughness characteristics.

Example VIII

Four hundred parts of the polymer prepared in Example V, 43.5 parts of poly-pentaerythritol and 0.8 part of calcium oxide were heated with stirring at 550 degrees F. for 10 hours and 30 minutes.

A mixture of 373 parts of the resultant ester (acid number of 9.4) and 590 parts of dehydrated castor oil was heated at 550 degrees F. for 4 hours. The product had an acid number of 12.9, a "cure" of 16 seconds, a viscosity of U (Gardner-Holdt) at 60% solids in mineral spirits, and gave clear films with excellent drying and toughness characteristics.

Example IX

Four hundred parts of the polymer prepared in Example V, 41.8 parts of sorbitol and 0.8 part of calcium oxide were heated with stirring at 550 degrees F. for 20 hours and 15 minutes.

A mixture of 350 parts of the resultant ester (acid number of 20.65) and 554 parts of dehydrated castor oil was heated at 550 degrees F. for 7 hours. The product had an acid number of 19.9, a "cure" of 30 seconds, a viscosity of S (Gardner-Holdt) at 60% solids in mineral spirits and gave clear films with excellent drying and toughness characteristics.

Example X

A varnish was made from the polymer prepared in Example V by heating 500 parts of the polymer with 766 parts of "Isoline" fatty acids (fatty acids from dehydrated castor oil) and 191 parts of pentaerythritol at 460 degrees F. for 30 minutes and then at 550 degrees F. for 8 hours and 30 minutes, at which point the acid value was 5.6 and the "cure" 35 seconds. The resultant varnish had a viscosity of U (Gardner-Holdt) at 60% solids in mineral spirits and gave clear films with excellent drying and toughness characteristics.

Example XI

Six hundred and ninety-nine parts of the polymer prepared in Example V, 52.5 parts of glycerine and 1 part of calcium oxide were heated with stirring at 550 degrees F. for 8 hours and 10 minutes.

A mixture of 212 parts of the resultant ester (acid number of 10.6, and bar melting point of 168 degrees F.) and 345 parts of oiticica oil was heated at 550 degrees F. for 10 minutes. The product had an acid number of 7.6, a "cure" of 22 seconds, a viscosity of O (Gardner-Holdt) at 60% solids in mineral spirits and gave clear films with excellent drying and toughness characteristics.

Example XII

The procedure of Example XI was followed in every detail except that 331 parts of China-wood oil were used instead of 345 parts of oiticica oil. When the temperature of the China-wood oil mixture had barely reached 550 degrees F., the "cure" was 24 seconds and the acid number 8.2. The varnish solution at 60% solids in mineral spirits had a viscosity of Q (Gardner-Holdt), and gave clear films with excellent drying and toughness characteristics.

Example XIII

A mixture of two parts of rosin and one part of styrene was heated with stirring at 320–440 degrees F. for 5 hours and 30 minutes, the temperature being raised as rapidly as permitted by the reflux. The product, after a 45 minute steam blow and a 15 minute carbon dioxide blow, had a melting point of 155 degrees F. and an acid number of 108. This resin was used in making the ester gum varnishes of Examples XIV–XVII.

Example XIV

Five hundred parts of the polymer prepared in Example XIII, 33 parts of glycerine and 1 part of calcium oxide were heated with stirring at 550 degrees F. for three hours.

A mixture of 447 parts of the resultant ester (acid number 10.6, and bar melting point 202 degrees F.) and 705 parts of dehydrated castor oil was heated at 550 degrees F. for five hours, at which point the product had an acid number of 13.9 and a "cure" of 26 seconds. The varnish solution at 60% solids in mineral spirits was cloudy and had a viscosity of U (Gardner-Holdt). Films of this material remained cloudy.

Example XV

Five hundred parts of the polymer prepared in Example XIII, 35.6 parts of pentaerythritol and 1 part of calcium oxide were heated with stirring at 460 degrees F. for one hour and then at 550 degrees F. for 18 hours.

A mixture of 449 parts of the resultant ester (acid number 10.2, and bar melting point 186 degrees F.) and 710 parts of dehydrated castor oil was heated at 550 degrees F. for 6 hours, at which point the product had an acid number of 13.6 and a "cure" of 27 seconds. The varnish solution at 60% solids in mineral spirits was cloudy, and had a viscosity of V (Gardner-Holdt). Films of this material remained cloudy.

Example XVI

Five hundred parts of the polymer prepared in Example XV, 56.4 parts of sorbitol and 1 part of calcium oxide were heated with stirring at 510–550 degrees F. for 20 hours.

A mixture of 428 parts of the resultant ester (acid number 12.6 and bar melting point 198 degrees F.) and 682 parts of dehydrated castor oil was heated at 550 degrees F. for 4 hours and 45 minutes, at which point the product had an acid number of 17.8 and a "cure" of 25 seconds. The varnish solution at 60% solids in mineral spirits was cloudy, and had a viscosity of U (Gardner-Holdt). Films of this material remained cloudy.

The fact that a film of the material prepared as in Examples XIV to XVI was cloudy indicates that the ratio of 2 parts of rosin to 1 part of styrene is approximately the critical minimum for the preparation of clear varnishes in accordance with the invention. These compositions, however, are still excellent for the preparation of enamels, that is to say, varnishes to which pigments have been added.

Enamels were made from the varnishes of Examples II, III, IV, VI, VII, VIII, IX, X, XI, XII, XIV, XV, and XVI as follows: 250 parts of the varnish and 400 parts of titanium oxide ("Titanium", C. P.—a product of the Titanium Pigment Company) were mixed and ground on a roller mill. Sufficient varnish was added to the resultant paste to give a ratio of 1:13 parts resin; 1 part pigment. Lead naphthenate drier equivalent to 0.5% and cobalt naphthenate drier equivalent to 0.05% of the oils was added. The enamel properties are given hereinafter in Table III.

In the foregoing examples the interpolymers were made in glass flasks equipped with thermometer, agitator, reflux condenser and water trap. The water trap was necessary to remove a small amount of water present in the rosin.

The term "cure" as used herein refers to the number of seconds required to gel a thin film of the resinous composition when spread on a hot plate set at a designated temperature. In the examples all "cures" were performed on a hot plate set at 390 degrees F.

The "bar melting point" is the melting point determined by spreading the powdered resinous material on a bar having graduated temperatures along its length and ascertaining the temperature, by a thermocouple device, at that section of the bar where the powder melts.

The styrene used in the foregoing examples was a commercial monomeric styrene containing a small amount of an inhibitor or stabilizer (N99 grade of styrene made by Dow Chemical Company, containing 99% styrene, the remainder being a stabilizing agent and impurities.) The rosin used was a water-white gum rosin (WW grade) and the dehydrated castor oil employed was a 45 poise dehydrated castor oil. "Dehydrol" is the trade name of a dehydrated castor oil made by the Sherwin-Williams Company.

The "mineral spirits" used in the examples had a boiling range of 150–200 degrees C. and less than 10% of aromatic hydrocarbons. This type of solvent is well known in the art and since it is substantially a non-aromatic in character, is a preferred type of solvent for varnish bases.

"Isoline" fatty acids are a product of the Woburn Chemical Company of New Jersey, and are prepared by the saponification of dehydrated castor oil. The polypentaerythritol used in these examples was the "Polypentek" made by the Heyden Chemical Corporation, which is a mixture of poly-pentaerythritols, having a melting range of 225–235 degrees C. The pentaerythritol and sorbitol were of the ordinary commercial grades made by the Heyden Chemical Corporation and the Atlas Powder Company, respectively.

The viscosities mentioned herein are referred to the Gardner-Holdt scale. Before films were flowed, naphthenate driers were added to the varnish solutions in sufficient quantities to give 0.5% lead naphthenate and 0.05% cobalt naphthenate.

The characteristics of the products prepared in the foregoing examples are illustrated by the following tables:

Table I

| Example | Rosin-Styrene Ratio | Alcohol | Properties of Esterfied Polymer | |
|---|---|---|---|---|
| | | | M. P. | Acid No. |
| II | 9-1 | Glycerine | 174 | 12.0 |
| III | 9-1 | Pentaerythritol | 187 | 9.5 |
| IV | 9-1 | Sorbitol | 182 | 29.7 |
| VI | 3-1 | Glycerine | | 9.6 |
| VII | 3-1 | Pentaerythritol | | 9.5 |
| VIII | 3-1 | Poly-pentaerythritol | | 9.4 |
| IX | 3-1 | Sorbitol | | 20.65 |
| X | 3-1 | Pentaerythritol | | |
| XI | 3-1 | Glycerine | 168 | 10.6 |
| XII | 3-1 | do | 168 | 10.6 |
| XIV | 2-1 | do | 202 | 10.6 |
| XV | 2-1 | Pentaerythritol | 186 | 10.2 |
| XVI | 2-1 | Sorbitol | 198 | 12.6 |

Table II

| Example | Rosin Styrene Ratio | Alcohol | Oil | Varnish Properties ||||||
|---|---|---|---|---|---|---|---|---|
| | | | | Acid No. | Cure | Viscosity (Gardner-Holdt) | Solution | Film |
| II | 9-1 | Glycerine | "Dehydrol" | 6 | 27 | S | Clear | Clear. |
| III | 9-1 | Pentaerythritol | do | 5.4 | 27 | U-V | do | Do. |
| IV | 9-1 | Sorbitol | do | 15.9 | 27 | O | do | Do. |
| VI | 3-1 | Glycerine | do | 15.0 | 27 | T | do | Do. |
| VII | 3-1 | Pentaerythritol | do | 14.4 | 29 | Q | do | Do. |
| VIII | 3-1 | Poly-Pentaerythritol | do | 12.9 | 16 | U | do | Do. |
| IX | 3-1 | Sorbitol | do | 19.2 | 30 | S | do | Do. |
| X | 3-1 | Pentaerythritol | "Isoline" Fatty Acids | 5.6 | 35 | U | do | Do. |
| XI | 3-1 | Glycerine | Oiticica | 7.6 | 22 | O | do | Do. |
| XII | 3-1 | do | China-wood | 8.2 | 24 | Q | do | Do. |
| XIV | 2-1 | do | "Dehydrol" | 13.9 | 26 | U | Cloudy | Cloudy. |
| XV | 2-1 | Pentaerythritol | do | 13.65 | 27 | V | do | Do. |
| XVI | 2-1 | Sorbitol | do | 17.8 | 25 | U | do | Do. |

Table III

| Example | Rosin Styrene Ratio | Alcohol | Oil | Enamel Properties ||
|---|---|---|---|---|---|
| | | | | Gloss | Recoatability at 16 hours |
| II | 9-1 | Glycerine | "Dehydrol" | Excellent | Excellent. |
| III | 9-1 | Pentaerythritol | do | do | Do. |
| IV | 9-1 | Sorbitol | do | do | Do. |
| VI | 3-1 | Glycerine | do | do | Do. |
| VII | 3-1 | Pentaerythritol | do | do | Do. |
| VIII | 3-1 | Poly-Pentaerythritol | do | do | Do. |
| IX | 3-1 | Sorbitol | do | do | Do. |
| X | 3-1 | Pentaerythritol | "Isoline" Fatty Acids | do | Do. |
| XI | 3-1 | Glycerine | Oiticica | do | Do. |
| XII | 3-1 | do | China-wood | do | Do. |
| XIV | 2-1 | do | "Dehydrol" | do | Good. |
| XV | 2-1 | Pentaerythritol | do | do | Do. |
| XVI | 2-1 | Sorbitol | do | Good | Do. |

For the preparation of clear varnishes, the ratio of rosin to styrene (or their equivalents) should preferably be at least 3:1 by weight. The upper limit is preferably a weight ratio of rosin to styrene (or their equivalents) of 9:1. For the production of enamels the weight ratio of rosin to styrene (or their equivalents) may be as low as 2:1, the upper limit being the same. Thus, it is possible to use a higher proportion of styrene where the final product is to be used as an enamel. There is an upper limit, however, since the use of a cloudy solution ordinarily has a deleterious effect on the gloss and a point is reached where the suspended particles interfere with the gloss. The upper limit is also determined, to some extent, by the point at which a film of the coating composition is not recoatable within a reasonable period of time, say 24 hours.

The resin acid employed should preferably be a gum rosin, such as WW gum rosin, which has no crystallizing tendency. Wood rosin can be employed, although it is somewhat yellower and other oil soluble acidic resins containing free carboxylic acid groups can be used, but the best results have been obtained with rosin or materials containing rosin. As examples of other types of resin acids can be mentioned polymerized rosin, talloel, (a by-product of the paper industry containing about 41–50% rosin, 50% non-conjugated fatty acids and up to 9% unsaponifiables) and natural resins, such as cracked copals which are cracked to an acid number of say 30 to 50 and are oil soluble. Rosin usually has an acid number of 150 or higher and, in general, the resins used may have an acid number of 50 or higher.

Although pure styrene may be used, the commercial styrenes containing substances to stabilize them against polymerization at ordinary temperatures have been found to be satisfactory. Thus, styrene containing less than 1% of a stabilizer which became ineffective around 300 degrees F. gave good results. The styrene may also be replaced in part with alpha methyl styrene, para chloro styrene, alpha chloro styrene, meta chloro styrene, para methyl styrene, meta methyl styrene, ortho methyl styrene and/or dichloro or dimethyl styrene derivatives.

Various types of oils may be employed in the practice of the invention, including both drying oils and semi-drying oils. Both types are referred to herein as drying oils. As examples of oils which are suitable for the practice of the invention, the following may be mentioned:

Soybean oil, non-conjugated --- Semi-drying oil
Linseed oil, non-conjugated --- Drying oil
"Thermoil A," non-conjugated --- Drying oil
"Dehydrol" (dehydrated castor oil), about 20–25% conjugated --- Drying oil
China-wood oil, about 80% conjugated --- Drying oil
Oiticica oil, about 80% conjugated --- Drying oil Dehydrated castor oil has given excellent results and good results have also been obtained with linseed oil and a combination of dehydrated castor oil and "Thermoil A" (made by the Vegetable Oil Products Company). "Thermoil A" is an extracted and refrigerated fish oil resembling linseed oil in properties. The oils which have a high percentage of conjugation undergo very rapid polymerization during the heating period required for bodying and hence these oils, such as China-wood oil, have a tendency to gel at relatively high temperatures, say 550 degrees F. It is preferable, therefore, to employ these oils in smaller proportions than the less highly conjugated oils, such as dehydrated castor oil.

In carrying out the invention the "cure" should be followed closely to prevent gelation and, when the proper "cure" is reached, the heating stopped regardless of the acid number. The acid number at this point will ordinarily be below 25. A low acid number in the finished product is desirable because a high acid number tends to produce poor water resistance. The "cure" test is not applied to the preparation of the polymer per se, but rather to the preparation of the varnishes. Too long a "cure" indicates that the product will not dry properly. Too short a "cure" indicates that it is too close to the point where it sets to a gel. A product with 0 seconds "cure" is unsatisfactory. A varnish should preferably have a "cure" between 20 and 60 seconds.

The nature of the reactions involved is not definitely known, but it is believed that the styryl compound and the resin acid combine to produce a polymer containing a free carboxylic acid group or groups in the polymer and the reaction with the alcohol esterfies or partially esterifies the polymer, with further polymerization. Ordinarily, the esterification reaction does not completely esterify the free acid groups present in the polymer, and the final acid number of the ester is preferably within the range of 5 to 15.

In the examples it will be observed that a small amount of calcium oxide is employed as an esterification catalyst to accelerate the esterification reaction. Any other esterification catalyst which does not unduly darken the product may be employed. Suitable types of esterification catalysts are well known to those skilled in the art.

Varnishes and enamels produced in accordance with the invention have a high solids content which is largely governed by the amount of solvent added and is preferably within the range of 50–60%.

In the preparation of the enamels any well known type of pigment may be employed, including titanium dioxide, chrome yellow, chrome green, red iron oxide, ferrite yellow, toluidine red, Prussian blue, lampblack and Monastral blue.

It will be understood that the "length" of the varnish or enamel may vary within rather wide limitations, it preferably being within the range of about 12 to about 40 gallons of drying oil per hundred pounds of esterified polymer.

The resinous composition as produced in accordance with the invention makes it possible to prepare coating compositions having good water resistance, good alkali resistance, and good drying characteristics. The esterified polymers can be incorporated directly with drying oils without the necessity for a pretreatment of the oil.

Having thus described the invention, what we claim as new and desire to secure by Letters Patent of the United States is:

1. A resinous ester of a polyhydric alcohol with a copolymer of styrene and rosin, the weight ratio of rosin to styrene being within the range of 2:1 to 9:1 and the copolymer being formed at a temperature within the range of 300 degrees F. to 550 degrees F., said ester having a bar melting point within the range of 168–202 and an acid value within the range of about 9.5 to about 30.

2. A resinous ester of glycerine with a copolymer of styrene and rosin, the weight ratio of rosin to styrene being within the range of about 2:1 to about 9:1 and the copolymer being formed at a temperature within the range of 300 degrees F. to 550 degrees F.

3. A coating composition comprising a drying oil and a polyhydric alcohol ester of styrene interpolymerized at temperatures within the range of 300 degrees F. to 550 degrees F. with rosin, the ratio of said rosin to said styrene being within the range of about 2:1 to about 9:1.

4. A coating composition comprising a drying oil and a polyhydric alcohol ester of a copolymer of rosin and styrene, the weight ratio of rosin to styrene being within the range of 2:1 to 9:1 and the copolymer being formed at temperatures within the range of 300 degrees F. to 550 degrees F.

5. A clear varnish composition capable of being applied to form clear films which exhibit good gloss, low odor, good color, satisfactory drying characteristics, good recoating characteristics, substantial resistance to water and alkalis, said composition comprising a polyhydric alcohol ester of the product of the polymerization of rosin with styrene at temperatures within the range of 300 degrees F. to 550 degrees F. in a weight ratio within the range from about 3:1 to about 9:1, a predominantly non-conjugated drying oil, and a substantially non-aromatic solvent in proportions such that the solids content forms a major proportion by weight of said composition.

6. A composition as claimed in claim 5 in which the drying oil is dehydrated castor oil.

7. An enamel comprising a pigment and a polyhydric alcohol ester of the interpolymerization product of styrene and rosin interpolymerized at temperatures within the range of 300 degrees F. to 550 degrees F. in proportions of rosin to styrene within the range of from about 2:1 to about 9:1, dispersed in a drying oil.

8. A process of producing new and improved resinous compositions which comprises polymerizing rosin and styrene in a weight ratio of the rosin to the styrene within the range from about 2:1 to 9:1 at temperatures within the range of 300 degrees F. to 550 degrees F., and at least partially esterifying the resultant polymerization product with a polyhydric alcohol.

9. A method as claimed in claim 8 in which rosin and styrene are employed in a weight ratio of approximately 3:1.

10. A process of producing new and improved resinous compositions which comprises polymerizing rosin and styrene in a weight ratio of the rosin to the styrene within the range from about 2:1 to 9:1 at temperatures within the range of 300 degrees F. to 550 degrees F., and at least partially esterifying the resultant polymerization product with glycerine.

11. A resinous ester of a polyhydric alcohol with a copolymer of styrene and an oil soluble natural resin containing a free carboxylic acid group and having an acid number of at least 150, the weight ratio of said natural resin to styrene being within the range from about 2:1 to about 9:1 and said copolymer being formed at a temperature within the range of 400 degrees F. to 500 degrees F.

12. A resinous ester of a polyhydric alcohol and a copolymer of styrene and an oil soluble natural resin having an acid number of at least 30, the weight ratio of said resin to styrene being within the range from 2:1 to 9:1 and the copolymer being formed at a temperature within the range of 300 degrees F. to 550 degrees F.

13. A coating composition comprising a resinous ester of a polyhydric alcohol and a copolymer of styrene and an oil soluble natural resin having an acid number of at least 30, the ratio of said resin to styrene in said copolymer being within the range of 2:1 to 9:1 and the copolymer being formed at temperatures within the range from 300 degrees F. to 550 degrees F., and a drying oil in which said resinous ester is dispersed, said composition being capable of forming clear films which have good drying properties, good gloss, good color, good hardness, satisfactory recoatability and substantial resistance to water and alkalies.

14. A method of producing new and improved resinous compositions which comprises copolymerizing styrene and an oil soluble natural resin having an acid number of at least 30 in proportions within the weight ratio of resin to styrene within the range from 2:1 to 9:1 and at temperatures within the range from 300 degrees F. to 550 degrees F., and at least partially esterifying the resultant product with a polyhydric alcohol.

JAMES A. ARVIN.
WAYNE B. GITCHEL.

REFERENCES CITED

The following references are of record in the file of this patent:

UNITED STATES PATENTS

| Number | Name | Date |
| --- | --- | --- |
| 1,942,531 | Barrett | Jan. 9, 1934 |
| 1,975,959 | Lawson et al. | Oct. 9, 1934 |
| 2,225,534 | Flint | Dec. 17, 1940 |
| 2,251,806 | Rust | Aug. 5, 1941 |
| 2,392,710 | Wakeford et al. | Jan. 8, 1946 |